Dec. 20, 1938.  A. E. PAIGE  2,141,015
DISPENSING APPARATUS
Filed July 3, 1934   4 Sheets-Sheet 1
FIG. I.
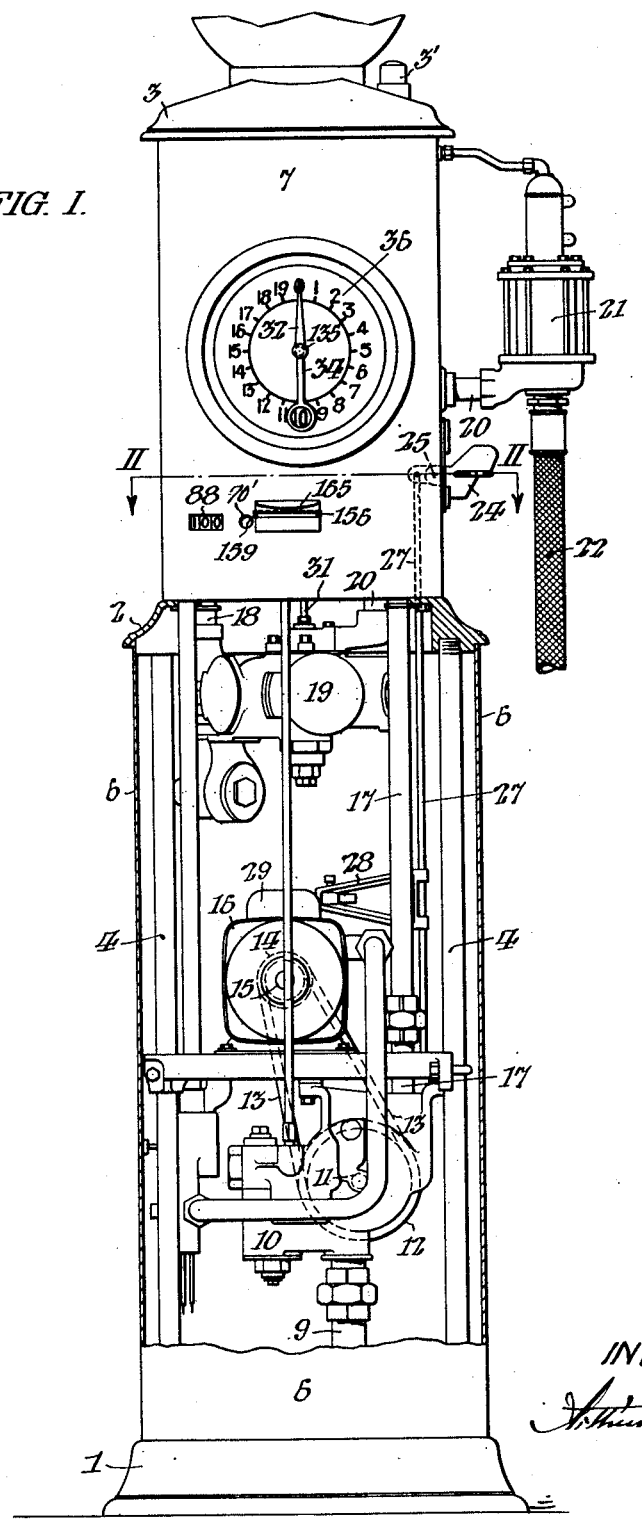
INVENTOR:
Arthur E. Paige Dec. 20, 1938.  A. E. PAIGE  2,141,015
DISPENSING APPARATUS
Filed July 3, 1934    4 Sheets-Sheet 2
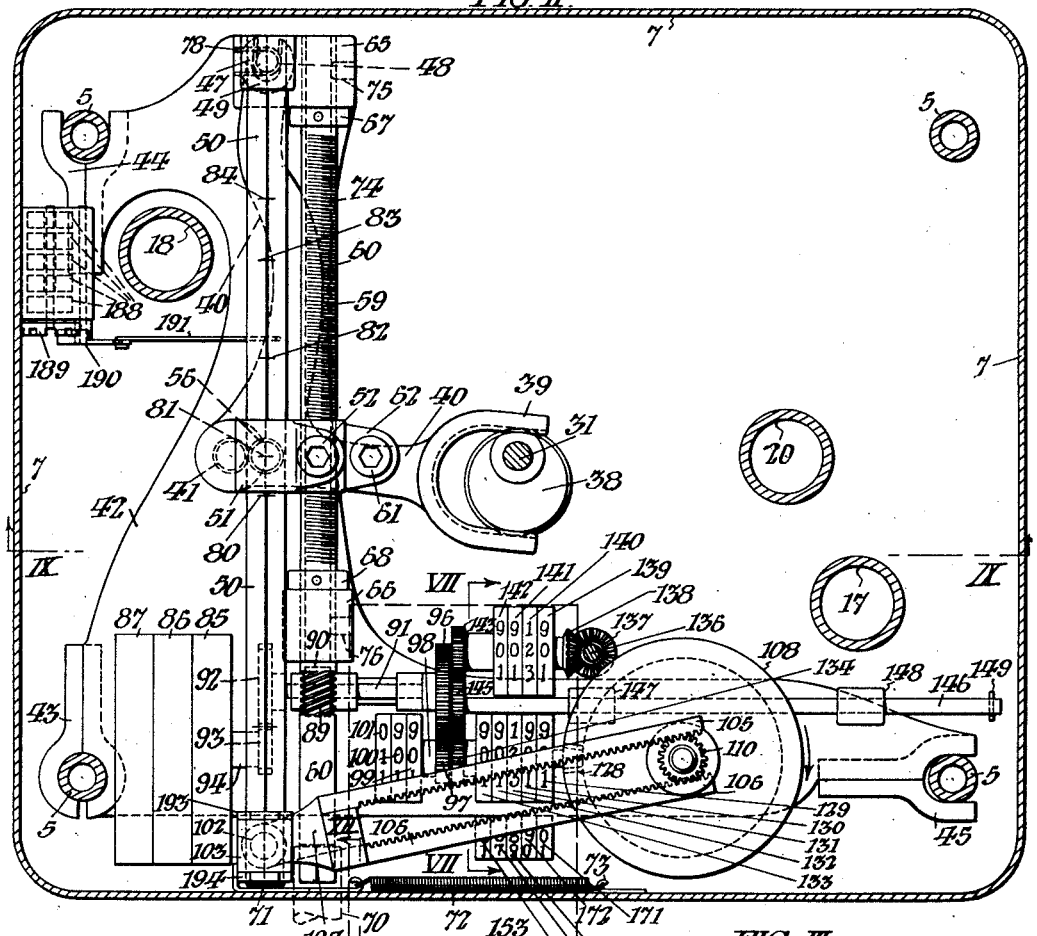
INVENTOR:
Arthur E. Paige Dec. 20, 1938.  A. E. PAIGE  2,141,015
DISPENSING APPARATUS
Filed July 3, 1934  4 Sheets-Sheet 3
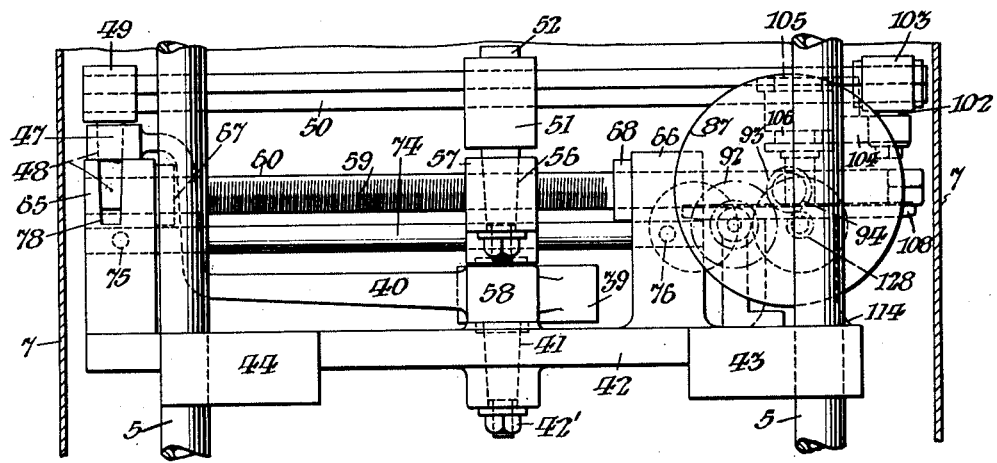
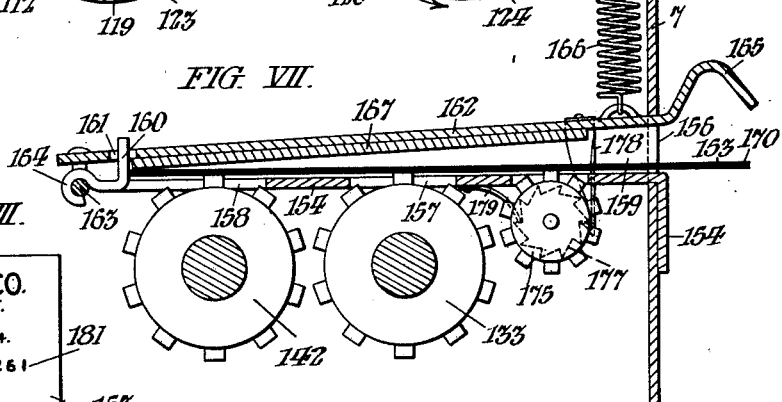
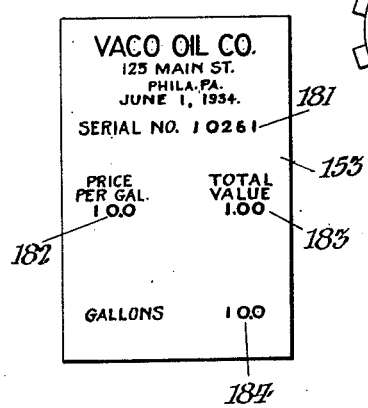
INVENTOR:

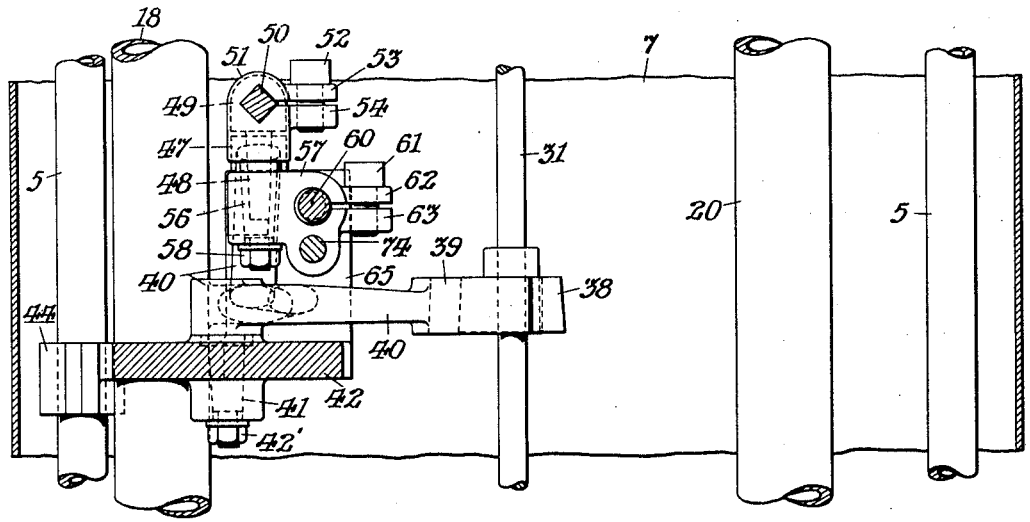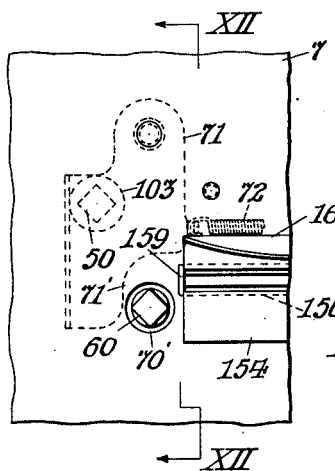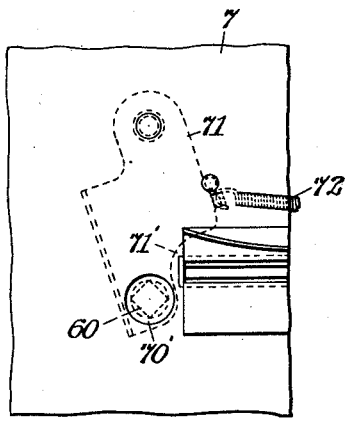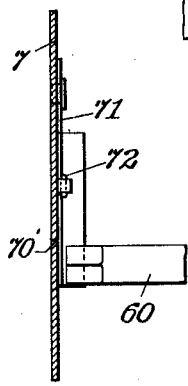

Patented Dec. 20, 1938

2,141,015

UNITED STATES PATENT OFFICE 2,141,015

DISPENSING APPARATUS

Arthur E. Paige, Philadelphia, Pa.

Application July 3, 1934, Serial No. 733,541

6 Claims. (Cl. 74—119)

My invention is particularly applicable to metering pumps for dispensing gasolene. The principal object and effect thereof is to provide simple and efficient means for automatically computing, registering, and preferably recording accurate coordinated indications of both the volume and the value of the liquid dispensed at each transaction. Such computation may be based upon any predetermined price of the liquid per unit of volume, which price may be varied, in fractions of a cent, by manually adjusting the computing mechanism.

In the form of my invention illustrated, the unit of liquid dispensed is a gallon and its value computed in tenths of a cent. The value based upon the whole cents of the price and the value based upon any fraction of a cent of the price are both automatically computed by a single mechanism arranged to be operated in conformity with and preferably by rotation of a meter through which the liquid is dispensed.

So far as I am aware, all devices of the prior art for effecting such computation must be disconnected from the volume metering device to permit adjustment of the computing mechanism in accordance with variations in the price per unit dispensed. On the contrary, it is characteristic of my invention that the computing mechanism may be adjusted in accordance with variations in price without disconnection thereof from the metering mechanism; thus insuring that there shall not be any opportunity for a dishonest operator to dispense liquid without computation and registry of the volume and value dispensed.

In the form of my invention hereinafter described, a lever is fulcrumed intermediate of its length and connected at one end with the metering mechanism and at the other end with a computing and registering mechanism. Said metering mechanism imparts an invariable movement to one end of said lever for each unit of volume of fluid dispensed, whereas, the opposite end of said lever imparts movement to the computing mechanism which is variable in accordance with the price of such unit. Such variation is effected by means affording a fulcrum for the lever, adjustable with respect to the lever, to vary the relative length of the opposite ends of the lever in accordance with such variation in price.

Of course, such computing mechanism may be utilized in dispensing other commodities than gasolene, and my invention includes the various novel features of construction and arrangement hereinafter more definitely specified.

In said drawings; Fig. I is an elevation of a fluid dispensing apparatus of the curbstand type with part of the outer casing removed to disclose the interior mechanism and embodying a convenient form of my invention.

Fig. II is a plan sectional view taken on the line II, II, in Fig. I but on a larger scale, showing the computing and registering mechanism; other parts of the structure of Fig. I being omitted. Fig. III is a front elevation of the mechanism shown in Fig. II as it appears from the lower side of the latter, with the casing removed. Fig. IV is a left hand side elevation of the mechanism shown in Figs. II and III. Fig. V is a fragmentary plan sectional view taken on the line V, V, in Fig. III showing the upper clutch. Fig. VI is a fragmentary plan sectional view taken on the line VI, VI, in Fig. III showing the lower clutch. Fig. VII is a fragmentary vertical sectional view taken on the line VII, VII, in Figs. II and III showing the construction and arrangement of the recording mechanism. Fig. VIII is a plan view of a sales record check showing the volume and value of liquid dispensed at a single operation. Fig. IX is a fragmentary vertical sectional view taken on the line IX, IX in Fig. II in the direction of the arrows on said line. Fig. X is a fragmentary elevation of the portion of the casing shown in Figs. I and II, including the keyhole, and indicating the key-hole shutter in dotted lines in its open position indicated in Fig. II. Fig. XI is a fragmentary elevation similar to Fig. X but showing the shutter in its closed position. Fig. XII is a fragmentary vertical sectional view taken on the line XII, XII in Figs. II and X.

Referring to Fig. I; the liquid dispensing apparatus is principally contained in the housing which is adapted to be rigidly mounted upon a pavement or a platform at a curb or driveway and includes three transversely extending cast metal frame members, viz., the base member 1, the intermediate member 2, and the top member 3. Said frame members 1, 2, and 3 are rigidly connected in the vertical relation shown by a columnar frame including the standards 4 connecting the frame member 1 with the frame member 2, and the standards 5 connecting the frame member 2 with the frame member 3. Said housing includes the two casing sections 6 and 7, one above the other, which are rectangular tubes with rounded corners; said section 6 extending between said frame members 1 and 2 and said casing section 7 extending between said frame members 2 and 3.

The liquid to be dispensed is conveniently stored in an underground tank from which it is elevated through the pipe 9 by the operation of the pump 10. Said pump includes a rotor having the shaft 11 with the grooved pulley 12 connected by the belt 13 with the grooved pulley 14 on the armature shaft 15 of the electric motor 16. The liquid is discharged from said pump 10 through the conduit 17 into a chamber in the frame member 3 serving to separate and permit escape to the atmosphere through the vent 3' of any air entrained in the liquid. The liquid from which the air has been eliminated passes downward from said frame member 3 through the conduit 18 into the meter 19 from which it is discharged through the conduit 20 and sight gage 21 into the flexible dispensing hose 22 which is provided at its free end with any convenient form of nozzle, preferably including a valve which is normally closed but may be opened by the dispensing operator. The hook lever 24 which is fulcrumed at 25 on said casing section 7 is provided to support the hose nozzle in idle position, the outer end of said lever being then depressed by the weight of the hose and nozzle. The inner end of said lever 24 is pivotally connected with the vertically reciprocatory rod 27 which carries the bracket 28 for operating the electric switch 29. The arrangement is such that when the outer end of the lever 24 is lowered, as shown, said switch 29 is opened to deenergize the motor 16 and stop the operation of said pump 10, but when said lever 24 is raised, said switch is closed to operate said pump.

Said meter 19 includes a rotor which is turned by the passage of the liquid therethrough from the conduit 18 to the conduit 20, and has the shaft 31 which makes one revolution for each gallon of liquid passed through said meter 19. That shaft is operatively connected, by friction clutch means with registering mechanism including the rotary indicating hands 32 and 34 arranged to traverse the stationary dial 36 which is graduated in gallons. Said hand 32 makes one revolution for each gallon dispensed and said hand 34 is moved the angular distance from one graduation to the next on said dial 36 at each revolution of said hand 32 so that the number of gallons and fractions of gallons dispensed are thus registered.

Said shaft 31 is utilized to actuate the computing mechanism by providing it with the cam 38 which, as best shown in Fig. II, is engaged between the bifurcations 39 of one arm of the bell crank lever 40. The perimeter of said cam is conical and the inner faces of said bifurcations 39 tapered to fit the same to prevent lost motion between said cam and lever. Said lever 40 has the fulcrum stud 41 which is also conical to prevent lost motion and is a rigid projection from the lever 40 journaled in the frame 42 and adjustably secured by the nut 42'. Said frame 42 is adjustably supported by said standards 5 to which it is secured by the three clamp plates 43, 44, and 45. Said plate 43 partly encircles the local standard 5 but the other plates 44 and 45 permit the frame to be clamped to respective other standards 5 despite slight variations in their location. The other arm of said lever 40 has bifurcations 47, shown in dotted lines in Fig. II, engaging the conical stud 48 pendent from the collar 49 carried by the end of the computing lever 50, as shown in Fig. IV. That lever is conveniently formed of a steel bar of square cross section, supported in the fulcrum block 51, longitudinally adjustable with respect to said lever, which is frictionally secured therein by the set screw 52. As shown in Fig. III, said screw extends through the clamp flange 53 which is slightly movable with respect to the main flange 54 of said block which engages said screw as a nut. Said block 51 affords a fulcrum for said lever 50 by its depending stud 56 which is conical and fitted in the similarly shaped socket in the slide bearing 57. Lost motion of said lever at its fulcrum is prevented by the nut 58 engaging the lower end of said stud 56, as shown in Fig. III.

Said slide bearing 57 is threaded to engage the thread 59 on the screw shaft 60 and may be frictionally engaged therewith by the set screw 61. Said screw extends through the clamp flange 62 which is slightly movable with respect to the main flange 63 of said bearing which engages said screw as a nut. Said screw shaft 60 is smoothly cylindrical where it extends through the bearing brackets 65 and 66 (which are conveniently cast in unitary relation with said frame 42) in which it is journaled, and longitudinal movement of said screw shaft 60 is prevented by the collars 67 and 68 which abut against opposite faces of said brackets 65 and 66, as shown in Fig. II.

Said screw shaft 60 is conveniently squared at its outer end, as indicated in Figs. II and III, to receive a key 70 which may be extended through an opening 70' in the side of said casing member 7, as indicated in Fig. II, to turn said shaft 60 in either direction to shift the fulcrum of said lever 50 longitudinally with respect thereto. Said opening is normally covered by the shutter 71 when drawn to the right in Fig. II by the spring 72 connecting it with the hook 73 on said casing 7, and is only opened when the lever 50 is brought into the position shown in Fig. II parallel with said screw shaft 60. In the latter position, said shutter is displaced to the left by said lever 50, against the stress of said spring 72 so as to bring the recess 71' in said shutter in registry with said opening 70' in the casing member 7. However, said opening 70' is normally closed by said shutter under stress of said spring 72 when the shutter is released by displacement of said lever 50 from its initial position shown in Fig. II. See Fig. XI.

Said slide bearing 57 is further supported by the rod 74, indicated in dotted lines in Figs. II and III, which extends through a closely fitting cylindrical bore in said slide bearing 57 and is mounted in parallel relation with said screw shaft 60 in bearings in said brackets 65 and 66 in which it is secured by set screws 75 and 76. Said bracket 65 has the tapered seat 78, shown in Figs. II and IV, which is open toward the left in Fig. II, to receive said conical stud 48 pendent from the lever 50 so that, in the position shown in Fig. II in which said lever 50 is brought parallel with the screw shaft 60, said conical stud 48 extends in and is held by said tapered seat 78, so that endwise movement of the lever is prevented and rotation of said screw shaft 60 while said lever 50 is thus prevented from moving endwise, shifts the fulcrum block 51 to establish the ratio between the lengths of the opposite ends of the lever corresponding with the price per unit of volume of the liquid dispensed.

The form of my invention shown has a range of from six cents to thirty-six cents per gallon. The lines 80, 81, 82, 83, and 84 extending transversely to the center line of said lever 50 in Fig. II, respectively indicate the positions to which the axis of the fulcrum stud 56 must be adjusted respectively for a price of six, ten, twenty, thirty, and thirty-six cents per gallon.

Moreover, the adjustment of said screw shaft 60 also effects the adjustment of a visible indicator of the price, so that the adjuster has merely to look at the indicator while turning said screw shaft 60 by the key 70 to determine when the fulcrum of the lever is in proper position for the current price. Such indicator conveniently includes the three disks 85, 86, and 87, which each have a circular series of numbers thereon from zero to nine and are connected so that one revolution of the disk 85 effects turning movement of the disk 86 to the angular extent from one numeral to the next on said disk 86, and one revolution of the latter effects the turning movement of the disk 87 from one numeral to the next thereon. The numerals on said disk 85 represent tenths of a cent and may be colored red, whereas, the numerals on the disk 86, which may be colored black, represent whole cents, and the numerals on the disk 87 each represent ten cents. Consequently, the price of the liquid to be dispensed is displayed by said indicating disks 85, 86, and 87 in whole cents and tenths of a cent at the window 88 in the front of the casing 7, which window is indicated in dotted lines in Fig. III. In order to conveniently effect such coordination of the rotary adjusting movement of the screw shaft 60 and of said price display indicator; I provide said screw shaft with the worm thread 89 engaging the worm gear 90 fixed on the shaft 91 which extends at right angles to said shaft 60 and carries the gear 92 engaging the gear 93 on the shaft 94 of the disk 85. The relation of said screw thread 59 and worm thread 89 on said screw shaft 60 to the gears 92 and 93 and disk 85, is such that one-half revolution of said shaft 60 effects an adjustment to the extent of one-tenth of a cent in the price displayed and in the corresponding position of the fulcrum stud 56 of the lever 50.

Furthermore, I prefer to also utilize the adjustment of said screw shaft 60 to set type for recording the price to which the computing lever 50 and the price display indicator are set as aforesaid. Such means includes the gear 96 on said shaft 91 which engages the gear 97 on the shaft 98 of the printing roller 99 which has a series of number type from zero to nine on its circumference representing tenths of a cent. Said roller 99 is operatively connected with the similarly numbered printing rollers 100 and 101 so that the three rollers 99, 100, and 101 are adjusted to present at the top thereof the numbers representing the current price per unit of volume of the liquid dispensed which is displayed at the front side of said disks 85, 86, and 87, as indicated in Fig. III.

The arrangement above described is such that although the pendent stud 48 of the computing lever 50 is shifted the same distance, back and forth, by each rotation of the shaft 31 and cam 38 representing one gallon of liquid dispensed through said meter 19, the opposite end of said lever, which is provided with the tapered stud 102 pendent from the collar 103 carried by said lever 50 is moved back and forth for each gallon dispensed a distance variable in accordance with the price adjustment of the fulcrum stud 56 of said lever effected as above described.

To effect computation, registration, and preferably permit the making of a record of the total value of the quantity of liquid dispensed at any operation, I find it convenient to pivotally connect said stud 102 with the reciprocatory head 104 which carries the double rack comprising the similar opposite rack bars 105 and 106. Reciprocation of said double rack by oscillation of said computing lever 50 is utilized to turn the bevel gear 108 in the same direction as the arrow on Fig. II, during each dispensing operation, to a variable extent determined by the price per gallon at which the device has been set. That is to say, each revolution of said shaft 31 and cam 38 caused by dispensing one gallon of liquid causes said double rack to be first moved to the right, by one-half revolution of said shaft and cam, to turn said gear 108 by the rack bar 105, and then moved to the left, to the position shown in Figs. II and III, by the other half revolution of said shaft and cam to turn said gear 108 by the rack bar 106.

Said racks 105 and 106 are respectively engaged with gears 110 and 111 which are the same size and construction but in vertically reversed relation to each other, as shown in Fig. III. Both gears 110 and 111 are mounted to turn freely on the hub 112 of said gear 108, which is journaled on the vertical stud shaft 113 fixed in the boss 114 on said frame 42. Said hub 112 has the circumferential clutch separating flange 115 projecting intermediate of the length of the cylindrical enlargement 116 on said hub, which enlargement carries the clutch rollers 117 and 118 respectively above and below said flange 115, and within the flanges 119 and 120 on said gears. Said gear 110 is supported in the position shown in Fig. III by said flange 115 and the gear 111 is supported in the position shown in said figure by the flange 121 which is fixed on said hub 112, by the pin 122.

As shown respectively in Figs. V and VI, said rollers 117 and 118 are carried in recesses 123 and 124 in said enlargement 116, which are involutley inclined in the same direction. Said rollers 117 and 118 are continually pressed in a direction to clutch said gear flanges 119 and 120, by respective springs 125 and 126, seated in said enlargement 116.

The construction and arrangement of said clutches is such that when the double rack is moved to the right in Figs. II and III, the rack bar 105 turns the gear 110 and its clutch flange 119 clockwise, as indicated by the arrow in Fig. V, with the effect of clutching said flange 119 with the rollers 117 and turning the gear 108 clockwise by such movement of the rack 105, whereas, the rack bar 106 turns the gear 111 and its clutch flange 120 counterclockwise, as indicated by the arrow in Fig. VI, thus disengaging the clutch rollers 118 from the clutch flange 120 of said gear 111 so that the rack 106 then has no effect upon said gear 108. However, when said double rack is thereafter moved to the left, to the position shown in Figs. II and III, the gear 110 is turned counterclockwise by the rack 105 with the effect of releasing its clutch rollers 117 and without turning movement of the gear 108, whereas, such movement to the left causes the rack 106 to turn the gear 111 clockwise with the effect of engaging its clutch rollers 118 with the enlargement 116 of the hub 112 on the gear 108 to turn the latter clockwise.

Therefore, every movement of the computing lever 50 effects clockwise movement of the gear 108 to an extent determined by the adjustment of the fulcrum of said lever in accordance with the price per unit of volume of the liquid dispensed. Said gear 108 is engaged with the beveled pinion 128 on the type roller 129 which has a circular series of number type faces thereon from zero to nine. Such numbers indicate tenths of a cent of the value of the liquid dispensed. Said roller 129 is provided with means operatively connecting it with the roller 130 which has a similar circular series of number type faces thereon but representing cents. One revolution of the roller 129 effects turning movement of the roller 130 to the angular extent from one numeral to the next thereon. Said roller 130 is operatively connected with similar rollers 131, 132, and 133, all loosely journaled on the same shaft so that one revolution of each turns the roller next adjoining on the left thereof to the angular extent from one numeral to the next thereon; so that the type on the group of rollers 129 to 133 inclusive is set by the movement of the gear 108 to represent the value of the liquid dispensed, by the type in a diametrical plane at the top of said rollers. Said shaft carrying the roller 133 has the gear 134 thereon by which the group of rollers may be set back to zero position, as hereinafter described.

The shaft 135 of said rotary indicating hand 32, shown in Fig. I, is in the middle of the casing 7, shown in section in Fig. II, above the plane of section of the latter. Said shaft 135 is parallel with the shaft 60 shown in Fig. II and is operatively connected, by a pair of spiral gears of the same hand, with the vertical shaft 136, shown in section in Fig. II, carrying the miter gear 137 engaging the miter gear 138 on the type roller 139 which has a circular series of number type faces thereon from zero to nine, representing tenths of a gallon of liquid dispensed. Said roller 139 is provided with means operatively connecting it with a roller 140 which has a similar circular series of number type faces thereon but representing gallons. One revolution of the roller 139 effects turning movement of the roller 140 to the angular extent from one numeral to the next thereon. Said roller 140 is operatively connected with similar rollers 141 and 142, all loosely journaled on the same shaft, upon which the numerals respectively represent tens and hundreds of gallons of liquid dispensed. Said shaft carrying the roller 142 has the gear 143 thereon by which the group of rollers 139 to 142 inclusive may be set back to zero position, as hereinafter described.

The set back mechanism includes the gear 145 which engages both the gear 134 on the type roller 133 and the gear 143 on the type roller 142. Said type rollers 133 and 142 are respectively connected with said gears 134 and 143 by one-way clutches which permit said rollers 133 and 142 to be advanced automatically by their connection with the liquid dispensing mechanism while said gears 134 and 143 remain stationary. Said gear 145 is rigidly connected with the shaft 146 journaled in the bearings 147 and 148 on said frame 42 and has at the right hand end thereof a cross pin 149 for engagement with a key 150 which may be inserted through the opening 151 in the casing 7. The volume indicating device, shown in Fig. I, comprising the hands 32, 34, and the shaft 135 is of a well-known type, including a one-way clutch through which said hands are advanced by rotation of said meter shaft 31 but which clutch permits said shaft 135 to be turned in the reverse direction independently of said shaft 31. Such indicating mechanism is shown, for instance, in Letters Patent of the United States No. 1,563,770 granted to William L. Marden, December 1, 1925, including such a pair of spiral gears ($e^3$ and $g$) as above mentioned. Such set-back means for applicant's tens transfer mechanism is of the type shown in Fig. XII of Letters Patent of the United States No. 2,086,363 granted July 6, 1937, to Carlton L. McMullen. The construction and arrangement of said set back mechanism are such that the operator may insert said key 150 in engagement with said shaft 146 and, at the termination of each dispensing operation, turn said key clockwise to reset to zero the volume indicating hands 32 and 34, the value indicating type rollers 129 to 133 inclusive and the volume indicating type rollers 139 to 142 inclusive, ready for the next dispensing operation. However, it may be observed that whereas the hands 32 and 34 are actually "set back"; i. e., turned backward with respect to the circular series of numbers comprising the volume scale shown in Fig. I; applicant's type rollers, etc., thus connected with the set-back mechanism are in fact advanced to reset them to zero in the same direction in which they are normally turned. As the meter shaft 31 is then held stationary, such turning movement of said key 150 overcomes the friction of the clutch aforesaid and turns said hands 32 and 34 backward with reference to the circular series of numerals 36 shown in Fig. I, but, advances said rollers 129 to 133 inclusive and 139 to 142 inclusive with respect to the numerals thereon, by engagement of the respective normally stationary shafts in coaxial relation with the respective series of rollers, with the unit numeral roller of each series. Such engagement is effected, by one way clutch means in each roller of each series, only when said shafts are manually turned in the direction to advance said rollers to their respective zero positions. Such construction and arrangement is necessitated by the employment of the Geneva type of transfer between the numeral rollers as hereinafter described.

Any suitable means may be employed to take an imprint from the type rollers aforesaid at the end of each dispensing operation to indicate the volume of liquid dispensed, the price at which it is dispensed, and its total value. However, I find it convenient to make such a record upon individual sales checks 153 each representing a single dispensing operation and preferably upon such checks in duplicate for each transaction, so that one copy may be retained by the seller and the other delivered to the purchaser.

Referring to Fig. VII; the front wall of the casing 7 supports the printing table 154 which extends through the opening 156 in said wall and is conveniently formed of sheet metal. Said table has an opening 157 fitted over the price indicating printing rollers 99, etc., and the value indicating type rollers 129, etc., which are in coaxial relation as shown in Fig. II. Said table has the opening 158 fitted over the volume indicating type rollers 139, etc. Said table 154 has vertically extending side flanges 159 extending to the top of said opening 156 and the upwardly turned check stop lug 160 extending through the opening 161 in the platen 162. Said platen has, at its inner end, the hinge bar 163 journaled in the hinge bearing 164 in said table and its outer end is provided with the handle flange 165 and is normally uplifted to the top of said opening 156 by the spring 166 extending from said platen to suitable fastening means on said wall 7. The under face of said platen 162 is conveniently provided with a covering of felt 167 or other resilient material. The arrangement is such that the operator may, at the conclusion of each dispensing operation, insert over said type rollers between the side flanges 159 of said table 154 and back to the check stop 160 a packet comprising duplicate checks 153 with duplicate sheets of carbon paper 170 respectively beneath each check with the carbon coating thereof presented toward the check. Thereupon, the operator may depress said platen 162 by its outwardly projecting handle flange 165 to cause the type rollers to imprint transfer material from said carbon paper upon each of said checks simultaneously to record the price, volume and total value of the liquid dispensed at that transaction.

Moreover, I find it convenient to identify each dispensing transaction by a serial number imprinted upon such records. Therefore, I provide the series of type rollers 171, 172, 173, 174, and 175, each having a similar circular series of number type faces thereon from zero to nine, said rollers respectively representing units, tens, hundreds, thousands, and tens of thousands. Said roller 171 has the ratchet wheel 177 by which it is turned one-tenth of a revolution at each printing operation of the platen 162; such movement being effected by the spring pawl 178 the upper end of which is fixed upon said platen and the lower end of which normally engages a tooth on the wheel 177, as indicated in Fig. VII. Said type roller 171 is prevented from turning clockwise by the spring keeper pawl 179, the inner end of which is conveniently fixed upon the under side of said table 154; so that, as the platen is drawn downward by the operator, said pawl 178 snaps over the next lower tooth on said ratchet 177 without turning said ratchet but turns it to the angular extent from one tooth to the next upon the return movement of said platen by said spring 166 to advance the serial number type one digit after each printing operation in readiness to imprint the next succeeding number upon the records of the next transaction.

Referring to Fig. VIII, the record check 153, which was inserted in the recording mechanism indicated in Fig. VII, upside down and with its bottom edge against the check stop 160, was thus imprinted in four places, to wit, at 181 with the serial number; at 182 with the price per gallon of the liquid dispensed, in tents of a cent; at 183 with the total value of the liquid dispensed, in tenths of a cent; and at 184 with the volume of liquid dispensed, in tenths of a gallon. The other indicia on said check are conveniently printed thereon before the record is made.

The movement of said bell crank lever 40 may be utilized to register the total number of gallons dispensed by the apparatus aforesaid by providing a totalizer mechanism including a series of five disks 188 each provided with a circular series of numbers from zero to nine upon its periphery, the first of said disks being provided with the ratchet wheel 189 which is turned the angular distance from one number to another by oscillation of the pawl 190 to successively engage teeth upon respectively opposite sides of said ratchet wheel, said pawl being oscillated by the connecting rod 191 extending from said pawl to said lever 40, as indicated in Fig. II.

Although any convenient means may be employed for connecting the adjoining numbered rotary elements aforesaid by which the price is displayed and the price and other numbers recorded; I find it convenient to provide each of said rotary members with two gear teeth upon the left hand side thereof for engagement with an eight toothed pinion which engages twenty teeth upon the right hand side of the next adjoining rotary member; said two teeth being in registry with the number "3" and with the effect of turning said members to present the proper numbers, as above described. Every other tooth of the series of eight on each of said pinions is extended over the left hand edge of the rotary element provided with said two gear teeth so that as the two gear teeth turn the pinion to move the next rotary number element, the cylindrical edge of the driving element is caught in the space between two successive teeth of the series of four extended as aforesaid; and the pinion is thus held stationary until the two teeth on the rotary element are again presented to turn the series of eight teeth of the pinion, to advance the numerals, either automatically by connection with the liquid dispensing mechanism, or manually by connection with their respective axial shafts when the latter are turned by means of the shaft 146 and key 150 indicated in Fig. III, and the part 5 connected therewith. I have found it convenient to employ numeral rollers, of an ordinary commercial type, wherein the one way clutch means for connecting said rollers with their respective axial shafts includes in each roller a spring pressed pawl continually stressed toward the axial shaft of that roller, which shaft has a groove extending longitudinally therein and common to all of the rollers which are loosely journaled thereon, which groove engages the free ends of said pawls only when said shaft 146 is thus manually turned to advance said rollers to their respective zero positions. Each of said numeral rollers has a gear in co-axial relation therewith by which it is automatically advanced by connection with the liquid dispensing mechanism, but such gears are connected with their respective numeral rollers by respective one-way clutches which permit the numeral rollers to be manually advanced as aforesaid, while those gears remain stationary. The numeral rollers of lower order are connected with those of higher order by transfer pinions which also remain stationary while the numeral rollers are being manually advanced to zero position except that each of the numeral rollers carries in rigid relation therewith two gear teeth which turn the respective transfer pinion one-quarter of a revolution at each revolution of the numeral roller; said transfer pinions being temporarily held stationary after each such quarter turn, by engagement of a Geneva stop recess on the pinion with the cylindrical edge of the driving element carrying the two teeth which are rigidly connected with the respective numeral roller. However, such construction of numbering mechanism is ordinary and not herein claimed.

I have found it convenient to make the length of said computing lever 50 eleven inches from the axis of the conical stud 48 at the upper end thereof in Fig. II, to the axis of the stud 102 at the lower end of said lever and to set the fulcrum stud 56 halfway between said other studs 48 and 102 when the price per gallon of fluid dispensed is ten cents. However, I find it convenient for effecting precise calibration of the computing mechanism to provide means for a slight adjustment of said stud 102 longitudinally with respect to the lever 50. Said lever is a square bar, conveniently three-eighths of an inch on each side, upon which the collar 103, which carries said stud 102, is closely fitted but capable of sliding longitudinally. I find it convenient to provide the end of said lever bar 50 upon which said collar is thus fitted, with a screw thread of one-half inch standard diameter which, of course, only cuts the corners of said bar, as indicated by the dotted lines in Fig. III, and to secure said collar in adjusted position by jam nuts 193 and 194 engaging said thread upon opposite sides of said collar. Such means of adjustment permit of compensation for any loss of motion of the clutches in the gears 110 and 111. In view of the proportion and arrangement of the parts aforesaid, I make the thread 59 on the screw shaft 60 single and left hand with a pitch of .0275 of an inch, between adjoining crests of the thread, and make the worm thread 89 double and right hand to engage the twenty teeth on the worm gear 90 which are thirty-two diametrical pitch. However, such details of construction are not of the essence of my invention.

Therefore, I do not desire to limit myself to the precise details of construction and arrangement herein set forth, as it is obvious that various modifications may be made therein without departing from the essential features of my invention, as defined in the appended claims.

I claim:

1. In an apparatus of the class described; the combination with a rotary driven eccentric; of a lever; means operatively connecting said eccentric with one end of said lever, whereby, oscillatory movement of constant amplitude is imparted to that end of said lever; a fulcrum member, adjustable longitudinally with respect to said lever; a slide bearing for said fulcrum member screw threaded as a nut; a screw shaft engaging said nut thread; stationary bearing means supporting and preventing longitudinal movement of said shaft; whereby, said slide bearing and the fulcrum of said lever may be precisely adjusted longitudinally with respect to said lever by rotation of said screw shaft; means for fixing said fulcrum in adjusted position on said lever; adjustable means for varying the effective length of the opposite end of said lever, independently of its fulcrum; a rotary drive member; means operatively connecting said drive member with the opposite end of said lever, including a gear in concentric relation with said drive member and a rack in mesh with said gear; a one-way clutch device, between said gear and said drive member; whereby, rotary movement may be imparted to said drive member by the oscillation of said lever, and the ratio of movement of the opposite ends of said lever may be varied in accordance with the position of said fulcrum.

2. In an apparatus of the class described; the combination with a lever of the first order; of means for imparting oscillatory movement of constant amplitude to one end of said lever; a fulcrum member, adjustable longitudinally with respect to said lever; a slide bearing for said fulcrum member screw threaded as a nut; a screw shaft engaging said nut thread; stationary bearing means supporting and preventing longitudinal movement of said shaft; whereby, said slide bearing and the fulcrum of said lever may be precisely adjusted longitudinally with respect to said lever by rotation of said screw shaft; means for fixing said fulcrum in adjusted position on said lever; whereby longitudinal movement of said lever is prevented; a rotary drive member; means operatively connecting said drive member with the opposite end of said lever, including a gear in concentric relation with said drive member and a rack in mesh with said gear; a one-way clutch device, between said gear and said drive member; whereby, rotary movement may be imparted to said drive member by the oscillation of said lever, and the ratio of movement of the opposite ends of said lever may be varied in accordance with the position of said fulcrum; and screw means at the driving end of said lever for adjustably varying its effective length.

3. In a variable lever linkage; the combination with a lever; of a fulcrum member for said lever adjustable longitudinally on said lever; a slide bearing for said fulcrum member screw threaded as a nut; a screw shaft engaging said nut thread; bearing means supporting and preventing longitudinal movement of said shaft; a stationary guide rod extending through said slide bearing, parallel with said shaft, and preventing turning movement of said slide bearing on said shaft; means for turning said screw shaft; whereby said slide bearing and the fulcrum of said lever may be precisely adjusted longitudinally on said lever by rotation of said screw shaft; means for fixing said fulcrum in adjusted position on said lever; means for preventing longitudinal movement of said lever during any adjustment of said slide bearing, including a stud pendent from said lever, and a socket in said bearing means fitted to hold said stud when said lever is parallel with said screw shaft; means continuously connected with one end of said lever, for oscillating it, with invariable amplitude; a variable drive gear having a hub; two clutch gears mounted to turn freely on said hub; separate one-way clutch means for respectively operatively connecting said two gears with said hub, said clutch means being oppositely disposed respectively in relation to said two clutch gears; two racks, rigidly connected and respectively engaged with opposite sides of said two clutch gears respectively; means pivotally connecting one end of said rigidly connected racks with the end of said lever opposite to that connected with said oscillating means; and means for adjustably varying the position of said rack pivot on said lever.

4. In a variable lever linkage; the combination with a lever; of a fulcrum member for said lever adjustable longitudinally on said lever; a slide bearing for said fulcrum member screw threaded as a nut; a screw shaft engaging said nut thread; bearing means supporting and preventing longitudinal movement of said shaft; a guide rod extending parallel with said shaft and preventing turning movement of said slide bearing on said shaft; means for turning said screw shaft; whereby said slide bearing and the fulcrum of said lever may be precisely adjusted longitudinally on said lever by rotation of said screw shaft; means for fixing said fulcrum in adjusted position on said lever; means for preventing longitudinal movement of said lever during any adjustment of said slide bearing, including a stud pendent from said lever, and a socket in said bearing means fitted to hold said stud when said lever is parallel with said screw shaft; means continuously connected with one end of said lever, for oscillating it, with invariable amplitude; a variable drive gear having a hub; two clutch gears mounted to turn freely on said hub; separate one-way clutch means for respectively operatively connecting said two gears with said hub, said clutch means being oppositely disposed respectively in relation to said two clutch gears; two racks, rigidly connected and respectively engaged with opposite sides of said two clutch gears respectively; and means pivotally connecting one end of said rigidly connected racks with the end of said lever opposite to that connected with said oscillating means; whereby uniform movement of said oscillating means effects variable oscillation of said lever and consequent variable reciprocation and oscillation of said racks, and alternate engagement of said two gears in clutched relation with said hub, and said variable drive gear is turned in the same direction by reciprocatory movement of said racks in alternately opposite directions.

5. In an apparatus of the class described; the combination with a rotary driven eccentric; of a lever of the first order; means operatively connecting said eccentric with one end of said lever, whereby, oscillatory movement of constant amplitude is imparted to that end of said lever; a fulcrum member, adjustable longitudinally with respect to said lever; a slide bearing for said fulcrum member screw threaded as a nut; a screw shaft engaging said nut thread; stationary bearing means supporting and preventing longitudinal movement of said shaft; means stationary with respect to said bearing means for preventing longitudinal movement of said lever, during adjustment of its fulcrum; means at one end of said screw shaft, whereby it may be turned to adjust said fulcrum; casing means for the latter end of said screw shaft having a hole in axial alinement with said shaft for insertion of means to turn said shaft; a shutter normally closing said hole; means on said shutter operative by said lever when the latter is moved into engagement with said means for preventing its longitudinal movement, to then hold said shutter open by said lever; whereby, said slide bearing and the fulcrum of said lever may be precisely adjusted longitudinally with respect to said lever by rotation of said screw shaft, only when said lever is engaged with said means for preventing its longitudinal movement; means for fixing said fulcrum in adjusted position on said lever; a rotary drive member; means operatively connecting said drive member with the end of said lever, in operative relation with said shutter, including a gear in concentric relation with said drive member and a rack in mesh with said gear; and a one-way clutch device, between said gear and said drive member; whereby, rotary movement may be imparted to said drive member by oscillation of said lever, and the ratio of movement of the opposite ends of said lever may be varied by rotation of said screw shaft, only when longitudinal movement of said lever is prevented.

6. In a variable lever linkage; the combination with a lever; of a fulcrum member for said lever adjustable longitudinally on said lever, without movement of said lever; a slide bearing for said fulcrum member screw threaded as a nut; a screw shaft engaging said nut thread; bearing means supporting and preventing longitudinal movement of said shaft; a stationary guide rod extending through said slide bearing, parallel with said shaft, and preventing turning movement of said slide bearing on said shaft; means for turning said screw shaft; whereby said slide bearing and the fulcrum of said lever may be precisely adjusted longitudinally on said lever by rotation of said screw shaft, without movement of said lever; means for maintaining said fulcrum fixed in adjusted position on said lever, during oscillation of said lever; means for preventing longitudinal movement of said lever during any adjustment of said slide bearing, including means on said lever which directly engages a stationary element only when said lever is parallel with said screw shaft; means for preventing rotation of said screw shaft except when said screw shaft and lever are parallel or when said lever is held against longitudinal movement; means continuously connected with one end of said lever, for oscillating it with constant amplitude; a variable drive gear having a hub; two clutch gears mounted to turn freely on said hub; separate one way clutch means for respectively operatively connecting said two gears with said hub, said clutch means being oppositely disposed respectively in relation to said two clutch gears; two racks, rigidly connected and respectively engaged with opposite sides of said two clutch gears respectively; and means pivotally connecting one end of said rigidly connected racks with the end of said lever opposite to that connected with said oscillating means; whereby, all movements imparted to said lever are derived from the means for oscillating it and at predetermined ratio which is variable solely by adjustment of the fulcrum of said lever, while said oscillating means is stationary and holds said lever stationary in parallel relation with said screw shaft.

ARTHUR E. PAIGE.